Sept. 9, 1958    R. N. STRAEHL ET AL    2,851,684
RESOLVER FOR DIRECTION FINDERS
Filed Oct. 25, 1956    2 Sheets-Sheet 1

INVENTOR.
ROBERT N. STRAEHL
WILLIAM J. STOLZE
BY
ATTORNEY

United States Patent Office 2,851,684
Patented Sept. 9, 1958

2,851,684
RESOLVER FOR DIRECTION FINDERS

Robert N. Straehl, Pittsford, and William J. Stolze, Rochester, N. Y., assignors to General Dynamics Corporation, Rochester, N. Y., a corporation of Delaware Application October 25, 1956, Serial No. 618,393

6 Claims. (Cl. 343—113)

This invention relates to direction finders and is particularly directed to resolvers in switch-lobe type systems.

In the direction finder art, it has been recognized that the resolution of directional antennas can be materially improved by rapidly moving or wobbling the lobe of the antenna so that the received signal in two positions of the lobe are always different in amplitude, excepting only when the signal source is on the median plane of the two lobe positions. The signal contemplated here may be received either from a remote primary high frequency source or from a reflecting object as in radar signals of fire control systems.

When the planes of oscillation of the receiving lobes are not in the true horizontal or vertical, it is often desirable to resolve the position information into these horizontal and vertical ordinates. In airborne direction finders, for example, it is important to the pilot that directional information received from the lobes be presented to him in true horizontal and vertical ordinates for easy pilotage. Resolvers for rotating coordinates are usually mechanical or electromechanical, and are quite complex and expensive.

The object of this invention is to provide an improved resolver for direction finders which is simple in construction, particular attention being directed to rotation of coordinates through a predetermined fixed angle.

The objects of this invention are attained by deriving the lobe signal voltages in the two orthogonal planes through the transmit-receive line-of-sight, adding the two signals algebraically, and then multiplying the two signals by a constant proportional to the sine or cosine of the angle through which the coordinates are to be rotated. The resolver of this information in effect projects the position information of the target on the new axes by adding the cosines of the two orthogonal voltage values.

Other objects and features of this invention will become apparent to those skilled in the art by referring to the specific embodiment described in the following specification and shown in the accompanying drawing, in which.

Figure 1:
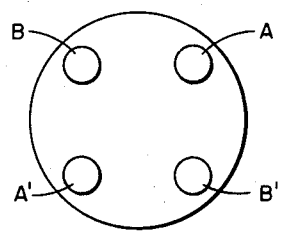
Fig. 1 is an elevational end-on view of an antenna array.
Figure 2:
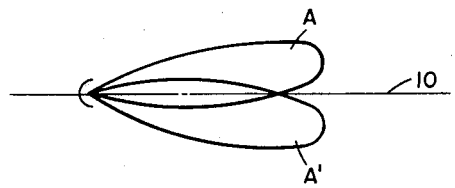
Fig. 2 shows in plan two switched lobes.

It is assumed in Fig. 1 that two pairs of antennas, A and A' and B and B', are employed and are arranged orthogonally in planes inclined say at 45° with the true horizontal and vertical planes. If the signal received by directional antennas A and A' are switched rapidly from one directional position to the other, the two lobes may be represented as in Fig. 2. The receiving pattern of the antenna pair A—A' can be represented by tear drops substantially as shown. It is apparent that the signal level received by antennas A and A' from any source displaced from the median line 10 of the lobes will be unbalanced. An identical pattern for the antennas B and B' can be drawn in a plane through B—B'. When such directional arrays are mounted in the nose of an aircraft, for example, it has been found desirable to dispose the lobe switching planes at 45° with the transverse line through the wing tips. While the target position information received by such a system may effectively be used by the computers and fire control circuits of the aircraft, such information cannot be presented to the pilot without rotating the coordinate information into true vertical and horizontal planes.

While two pairs of antennas are shown in Figure 1, it will be understood that the same electrical effects may be obtained by a single parabolic reflector and a single dipole or horn feed with two pairs of outlets slightly displaced from the focal point of the reflector. In this case, the energy may be switched rapidly by electronic switching means between A and A' on the one hand, and between B and B' on the other.

Figure 3:
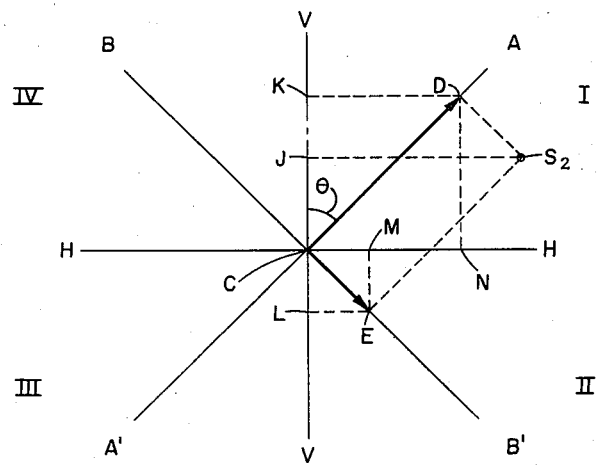
Fig. 3 is a vector diagram of the position information received by the array of Fig. 1.

Referring to Figure 3, let it be assumed that a signal source appears in a radiation pattern at point $S_2$ in the first quadrant of the horizontal-vertical coordinate system of the antenna array. Such a target or source will produce from antenna A—A' a signal proportional to CD, and from antenna B—B', a signal proportional to CE. That is, CD and CE are proportional to the displacement of source $S_2$ from the median plane of antenna B—B' and A—A'. To provide meaningful information to the pilot, it is necessary that the signals be altered so as to produce an up-down and left-right display. The desired up-down or vertical display is obtained from the component of $S_2$ projected on the vertical axis. From the diagram of Fig. 3, it can be seen that this can be obtained by summing the projections of D and E on the vertical axis. Similarly, the left-right or horizontal indication can be obtained from the sum of the horizontal projections of D and E on the H—H axis.

The problem of resolving the up-down component will now be considered. It will be noted that the desired output, CJ, is equal to CK plus CL, where CL is a negative quantity with respect to CK. Also, CK equals $CD \cos \theta$ and CL equals $-CE \cos \theta$. Fortunately, the angle $\theta$ remains fixed and the quantity $\cos \theta$ is a constant. It will appear now that it is superfluous to apply a device such as a conventional resolver with the capability of rotating coordinates through many arbitrary angles.

Where $\theta$ is 45°, as assumed in the specific embodiment shown, $\sin \theta = \cos \theta$ which is .707. Hence, $CJ = .707 (CD + CE)$. This indicates that the desired up-down signals may be obtained by algebraic addition and subtraction of the input data voltages CD and CE. Likewise, the left-right signals can be obtained by simple algebraic addition or subtraction.

The left-right signal, indicating the position of point $S_2$ with respect to the median plane V—V, may be represented by a quantity proportional to $.707(CM+CN)$. It is to be noted, referring to Fig. 3, that when the target is in the first or third quadrant, the up-down signal for presentation to the pilot must be derived by a subtraction operation, while the left-right information must be derived by an addition. If the target, however, is in the second or fourth quadrants, the adding and subtracting operations, respectively, for up-down and left-right indications are reversed.

Figure 4:
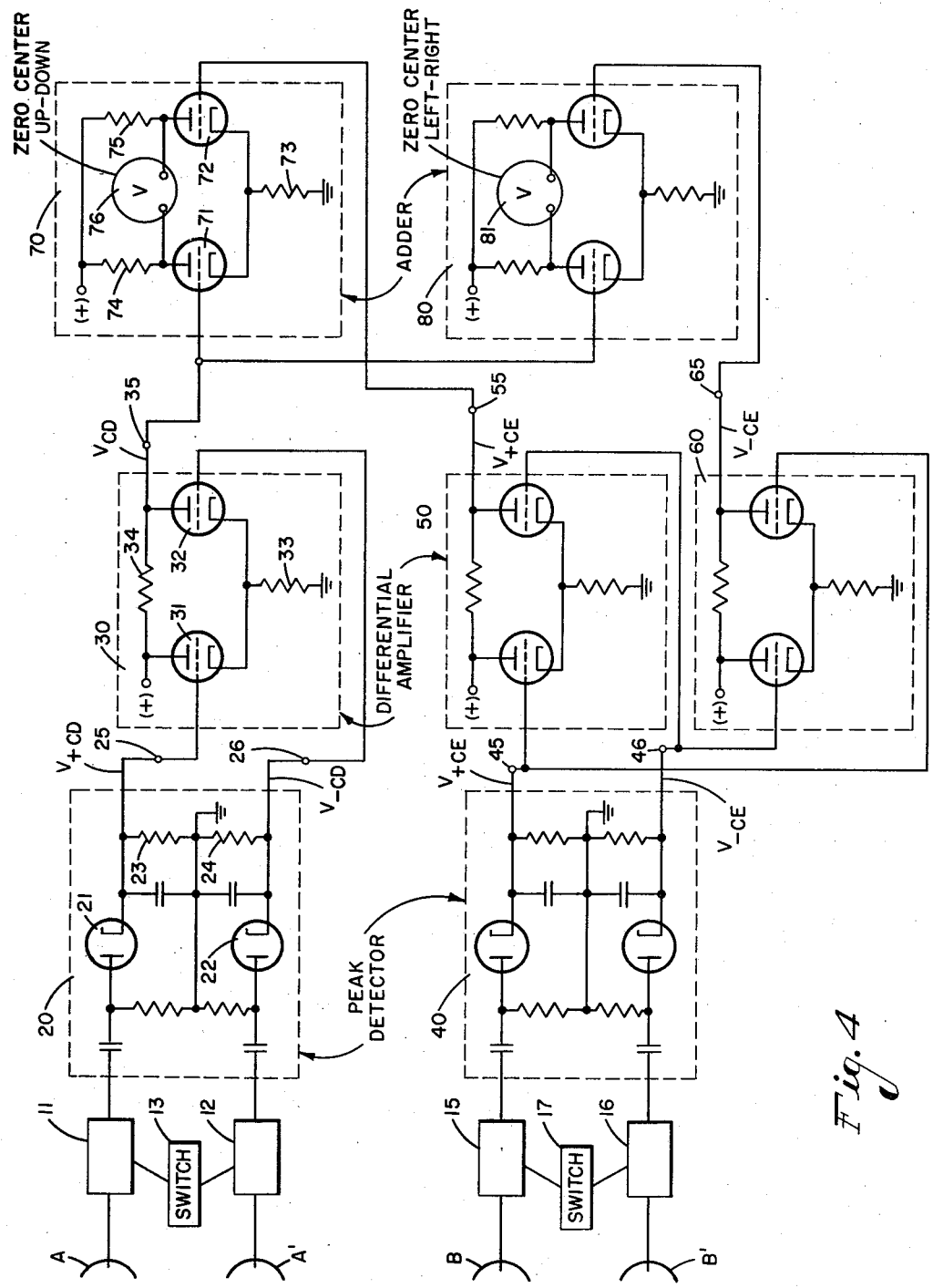
Fig. 4 is a circuit diagram of said specific embodiment.

In Figure 4 is shown specific circuits for performing this algebraic addition. The circuitry shown will, of course, suggest to those skilled in the art many variations thereof. For convenience of illustration, antennas A, A', and B, B' are shown as separate physical elements. Antennas A and A' are connected, respectively, with high frequency receivers 11 and 12. High speed switch 13 alternately activates the two receivers so that the signal passed by the receivers will be proportional to the position of the target or signal source in the two lobes of antennas A and A'. In a practical application of this information, antennas A and A' could be a common structure, the switch 13 serving to alternately connect the two lobe signals to the balanced two terminal receiver input.

Antennas B and B' are likewise connected to receiver amplifiers 15 and 16, respectively, alternately activated by switch 17.

Where the received energy is pulse modulated, the peak detectors 20 and 40 are employed. In detector 20, the two diodes 21 and 22 are connected in a balanced bridge including load resistors 23 and 24, center tapped and grounded as shown with output terminals 25 and 26. The voltage at terminals 25 and 26 will, respectively, be positive or negative with respect to the opposite terminal, depending on whether the signal source is on one side or the other of the median plane of antennas A—A'. These voltages are $V_{CD}$ and $-V_{CD}$, if the target $S_2$ is above the B—B' plane as assumed in Figure 3. If the target is below the B—B' plane, these polarities will be reversed.

The differential amplifier 30 determines the amplitude of the algebraic sum of the two CD signals. The particular amplifier shown comprises two triodes 31 and 32 with the common cathode resistor 33 and but one load resistor 34. The two control grids are connected, respectively, to the output terminals 25 and 26 of the peak detector 20. A signal producing conduction in either triode correspondingly diminishes conduction in the other triode by raising the potential in a positive direction of the common cathode connection. Accordingly, at the output terminal 35 of the differential amplifier appears a positive voltage proportional to the difference between the two CD signals.

The peak detector 40 for rectifying the signals from antennas B—B' may be identical to detector 20. The outputs 45 and 46 of detector 40 contain the CE position information of the target. Differential amplifier 50 is similar to amplifier 30 in that it also derives the difference voltage from the B—B' antennas at its output terminal 55. The amplitude of the voltage at 55 is determined by the relative values of voltage at 45 and 46. The third differential amplifier 60 is similar to and parallels amplifier 50, but the input connections to the amplifier from points 45 and 46 are reversed with respect to the connections to amplifier 50. Accordingly, voltage $V_{+CE}$ may appear at terminal 55, while voltage $V_{-CE}$ will appear at terminal 65.

Now, $V_{CD}$ is algebraically added to $V_{CE}$ in adder 70. The adder may also comprise two amplifiers such as triodes 71 and 72 with the common cathode resistor 73 and anode load resistor 74 and 75. Needle deflection of the voltmeter 76 will be proportional to the difference between the $V_{CD}$ and $V_{CE}$ voltages applied to grids 71 and 72. Such a meter could be a zero center voltmeter so that deflection to either side of center will indicate the distance of target $S_2$ above or below the horizontal plane H—H.

It is apparent that CM must be added to CN to obtain the left-right information. The subtraction is performed in the adder 80 where the plus value of $V_{CD}$ is added to the negative value of $V_{CE}$. Accordingly, meter 81 may be a center zero voltmeter labeled "azimuth" or "left-right."

If the angle of rotation is other than 45° where the $\sin \theta$ is not equal to $\cos \theta$, unequal amplifications of the two projected values onto the horizontal and vertical planes H—H and V—V must be made. For example, if ordinate A—A', Fig. 3, is at an angle of 30° with respect to H—H, then the projections on V—V must be multiplied by the cosine of 60°, or .500, while the projections on H—H must be multiplied by the cosine of 30°, or .867.

While a specific embodiment of this invention has been shown and described, other modifications will readily occur to those skilled in the art. It is not, therefore, desired that this invention be limited to the specific arrangement shown and described, and it is intended in the appended claims to cover all modifications within the spirit and scope of this invention.

What is claimed is:

1. In combination, a directional antenna system and means for cyclically moving the lobes of the antenna system to produce two signals, the relative values of which are representative of the position of a point signal source with respect to the median plane of the antenna lobes characterized in that means are provided for rotating the coordinate information of the signal source through a fixed angle from a first to a second Cartesian coordinate system, said means including differential amplifiers for determining the polarity, respectively, of the signals with respect to said first coordinate system; and means for algebraically adding the outputs of said amplifiers.

2. In combination, a directional antenna system, means for cyclically moving the lobes of the antenna system to produce two signals, the relative values of which are representative of the position of a point signal source with respect to the median planes of the antenna lobes, means for rotating the coordinate information of the signal source through a fixed angle from a first to a second Cartesian coordinate system, said means including a differential amplifier for determining the polarity respectively of the signals with respect to said first coordinate system, and means for algebraically adding the outputs of said amplifiers.

3. In combination, a directional antenna system having two pairs of orthogonally arranged lobe patterns, means for cyclically detecting the signals of the orthogonal pairs of patterns, a detector for each lobe signal, a first differential amplifier responsive to the signal of one pattern pair for comparing the amplitudes of the signals of said two pair; a second differential amplifier for comparing the signals of the second pattern pair, and means for algebraically adding the outputs of said first and second amplifiers.

4. A radio direction finder and target position indicator comprising a directional antenna system, a first receiver coupled to the antenna system for deriving signals of either polarity proportional to the displacement to either side, respectively, of a target from one plane through the target-to-antenna line-of-sight, a second receiver coupled to the antenna system for deriving signals of either polarity proportional to the displacement to either side, respectively, of the target from a second plane normal to said one plane; means for adding the outputs of the two receivers, an indicator coupled to the adding means; and means for subtracting the output of one receiver from the output of the other, and an indicator coupled to the subtracting means.

5. A radio direction finder and target position indicator, comprising a directional antenna system having two radiation lobe patterns, lobe switching means for oscillating the lobes, respectively, in two orthogonal planes, detectors coupled and responsive to the target signals in each of the switched positions of each lobe, a differential amplifier coupled to each detector for algebraically adding the target signals; and means for algebraically adding and indicating the polarity and amplitude of the outputs of the differential amplifiers.

6. In a navigating equipment with a directional antenna system, means for deriving two signals proportional, respectively, with the displacement of a radiating target from both of two orthogonal planes through the line-of-sight; and means for rotating the coordinates corresponding to the two derived signals through a predetermined angle into second coordinates, said means for rotating including an adder for adding the two derived signals and multiplying the sum threeof by the cosine of said angle.

References Cited in the file of this patent

UNITED STATES PATENTS

| | | |
|---|---|---|
| 2,419,946 | Edwards et al. | May 6, 1947 |
| 2,437,695 | Jansky | Mar. 16, 1948 |